(12) United States Patent
Wu et al.

(10) Patent No.: US 11,741,000 B2
(45) Date of Patent: Aug. 29, 2023

(54) METHOD AND SYSTEM FOR VERIFYING RESULTING BEHAVIOR OF GRAPH QUERY LANGUAGE

(71) Applicant: Vesoft Inc., Hangzhou (CN)

(72) Inventors: Min Wu, Hangzhou (CN); Xinglu Yi, Hangzhou (CN); Fenglin Hou, Hangzhou (CN); Xiaomeng Ye, Hangzhou (CN)

(73) Assignee: Vesoft Inc., Hangzhou (CN)

( * ) Notice: Subject to any disclaimer, the term of this patent is extended or adjusted under 35 U.S.C. 154(b) by 0 days.

(21) Appl. No.: 17/445,128

(22) Filed: Aug. 16, 2021

(65) Prior Publication Data

US 2022/0269584 A1 Aug. 25, 2022

(30) Foreign Application Priority Data

Feb. 25, 2021 (CN) .......................... 202110212904.0

(51) Int. Cl.
*G06F 11/36* (2006.01)
*G06F 16/903* (2019.01)
(Continued)

(52) U.S. Cl.
CPC ...... *G06F 11/3664* (2013.01); *G06F 11/3684* (2013.01); *G06F 11/3688* (2013.01);
(Continued)

(58) Field of Classification Search
CPC ............. G06F 11/3664; G06F 11/3684; G06F 11/3688; G06F 14/90335; G06F 16/9024;
(Continued)

(56) References Cited

U.S. PATENT DOCUMENTS 5,584,024 A * 12/1996 Shwartz .............. G06F 16/2423
704/7
6,990,484 B1 * 1/2006 Ghazal .............. G06F 16/24537
707/723
(Continued)

OTHER PUBLICATIONS

Micallef et al, "Lessons learnt from using DSLs for Automated Software Testing", IEEE, pp. 1-6 (Year: 2015).*
(Continued)

*Primary Examiner* — Anil Khatri
(74) *Attorney, Agent, or Firm* — ZIEGLER IP LAW GROUP LLC

(57) ABSTRACT

Disclosed are a method and system for verifying a resulting behavior of a graph query language. A lexical parser and a preset lexical rule are added to a BDD test framework, to construct an improved BDD test framework; a first Gherkin text in a graph query language standard is migrated to be a second Gherkin text in a graph query language; a first parsing result of the second Gherkin text is acquired from the improved BDD test framework; a first return result from a graph database is acquired, a comparison result between the first parsing result and the first return result is acquired, wherein the graph query language meets the graph query language standard if the first parsing result and the first return result are the same. The present disclosure solves the problem that the BDD test framework cannot recognize complex Gherkin texts, thereby facilitating development of graph databases.

3 Claims, 2 Drawing Sheets

(51) Int. Cl.
*G06F 16/901* (2019.01)
*G06F 40/237* (2020.01)
*G06F 40/205* (2020.01)

(52) U.S. Cl.
CPC .... *G06F 16/9024* (2019.01); *G06F 16/90335* (2019.01); *G06F 40/205* (2020.01); *G06F 40/237* (2020.01)

(58) Field of Classification Search
CPC . G06F 40/237; G06F 40/265; G06F 16/90335
USPC .................................................. 717/120–141
See application file for complete search history.

(56) References Cited

U.S. PATENT DOCUMENTS

| | | | | |
|---|---|---|---|---|
| 7,614,037 B2 * | 11/2009 | Gavrilov | ............. | G06F 16/9024 717/136 |
| 7,882,485 B2 * | 2/2011 | Feblowitz | ................. | G06F 8/10 717/136 |
| 8,370,812 B2 * | 2/2013 | Feblowitz | ................. | G08G 1/04 717/126 |
| 8,433,701 B2 * | 4/2013 | Sargeant | ............. | G06F 16/9024 707/714 |
| 10,073,763 B1 * | 9/2018 | Raman | ............. | G01R 31/31835 |
| 10,135,936 B1 * | 11/2018 | Venuraju | ............. | G06F 11/3414 |
| 10,223,417 B1 * | 3/2019 | Sirin | .................... | G06F 16/9024 |
| 10,713,252 B1 * | 7/2020 | Bourne | ............... | G06F 16/9024 |
| 10,810,110 B1 * | 10/2020 | Thomas | ............... | G06F 11/3664 |
| 11,281,460 B1 * | 3/2022 | Reddy | ........................ | G06F 8/75 |
| 11,379,482 B2 * | 7/2022 | Bourne | ............... | G06F 16/2455 |
| 11,537,609 B2 * | 12/2022 | Dwars | ................. | G06F 16/3332 |
| 11,625,394 B1 * | 4/2023 | Basavaiah | ............. | G06F 16/212 717/123 |
| 2020/0104241 A1 * | 4/2020 | Talukdar | ............. | G06F 11/3684 |
| 2021/0406265 A1 * | 12/2021 | Dwars | ................. | G06F 16/3332 |
| 2022/0050840 A1 * | 2/2022 | Parravicini | ........... | G06F 16/248 |

OTHER PUBLICATIONS

Alferez et al, "Bridging the Gap between Requirements Modeling and Behavior-driven Development", IEEE, pp. 239-249 (Year: 2019).*

Angles et al, "Foundations of Modern Query Languages for Graph Databases", ACM, pp (Year: 2017).*

Seifer et al, "Empirical Study on the Usage of Graph Query Languages in Open Source Java Projects", ACM, pp. 152-166 (Year: 2019).*

Hellings et al, "Walk Logic as a framework for path query languages on graph databases", ACM, pp. 117-128 (Year: 2013).*

Aiello et al, "Behavior-driven Clustering of Queries into Topics", ACM, pp. 1373-1382 (Year: 2011).*

* cited by examiner

METHOD AND SYSTEM FOR VERIFYING RESULTING BEHAVIOR OF GRAPH QUERY LANGUAGE

CROSS REFERENCE TO RELATED APPLICATION(S)

This patent application claims the benefit and priority of Chinese Patent Application No. 202110212904.0 filed on Feb. 25, 2021, the disclosure of which is incorporated by reference herein in its entirety as part of the present application.

TECHNICAL FIELD

The present disclosure relates to the technical field of databases, and in particular, to a method and system for verifying a resulting behavior of a graph query language.

BACKGROUND

With the rise of web2.0 websites, traditional relational databases have become unsatisfactory in dealing with SNS-type purely dynamic web2.0 websites with a super-large scale and high concurrency, which causes many insurmountable problems. Graph databases are developed to address the challenges posed by large-scale data collections with multiple data types. A graph query language is specifically used in the field of graph data, and can be used for describing operations such as adding, deleting, modification, and checking for graphs, and for the management as well as operation and maintenance of a graph database system itself. However, in the field of graph databases, there is no uniform graph query language standard, and some graph query language is incompatible with the graph query language standard, which hinders the development of graph databases.

A Behavior Driven Development (BDD) test framework often uses a Gherkin language to describe behaviors. The Gherkin language is a domain-specific language close to natural language, which uses keywords to define system features and tests. Keywords of the Gherkin language include feature, background, scenario, given, when, then, etc. A Gherkin text that contains only keywords is called a simple Gherkin text, and a Gherkin text that contains other syntactic units is called a complex Gherkin text. In the related technology, the BDD test framework can only recognize simple Gherkin texts, but not complex Gherkin texts, resulting in a single function.

No effective solution has been proposed to solve the problem that the BDD test framework in the related technology cannot recognize complex Gherkin texts, has a single function, and cannot verify whether the graph query language is compatible with the graph query language standard.

SUMMARY OF THE APPLICATION

Embodiments of the present disclosure provide a method and system for verifying a resulting behavior of a graph query language, to solve the problem that a BDD test framework in the related technology cannot recognize complex Gherkin texts, has a single function, and cannot verify whether a graph query language is compatible with a graph query language standard.

According to a first aspect, embodiments of the present disclosure provide a method for verifying a resulting behavior of a graph query language, including:

adding a lexical parser and a preset lexical rule to a BDD test framework, to construct an improved BDD test framework;

migrating a first Gherkin text in a graph query language standard to be a second Gherkin text in a graph query language according to syntax of the graph query language;

acquiring a first parsing result of the second Gherkin text from the improved BDD test framework, wherein the first parsing result is an expected result of the second Gherkin text;

checking a background environment and condition preparation according to the second Gherkin text, and executing the graph query language to acquire a first return result from a graph database, wherein the second Gherkin text includes the background environment, the condition preparation, the graph query language, and the expected result; and acquiring a comparison result between the first parsing result and the first return result from the graph database, wherein the graph query language meets the graph query language standard if the comparison result is that the first parsing result and the first return result are the same; otherwise, the graph query language does not meet the graph query language standard.

In some embodiments, before adding the lexical parser and the preset lexical rule to the BDD test framework, the method further includes: defining the preset lexical rule, and defining the preset lexical rule includes:

defining keywords in the graph database as a computer-recognizable text combination; and a process of parsing the second Gherkin text by the improved BDD test framework includes:

parsing the computer-recognizable text combination in the second Gherkin text according to the preset lexical rule to obtain the first parsing result.

In some embodiments, after constructing the improved BDD test framework, the method further includes:

acquiring a test case developed based on a Gherkin language as a third Gherkin text;

acquiring a second parsing result of the third Gherkin text from the improved BDD test framework, wherein the second parsing result is an expected result of the third Gherkin text;

acquiring a second return result from the graph database according to the third Gherkin text; and acquiring a comparison result between the second parsing result and the second return result from the graph database, wherein the graph database meets a test standard if the comparison result is that the second parsing result and the second return result are the same; otherwise, the graph database does not meet the test standard.

In some embodiments, acquiring the comparison result between the parsing result and the return result from the graph database includes:

acquiring a preset comparison manner;

determining whether the parsing result is the same as the return result from the graph database according to the preset comparison manner, wherein the comparison result is that the parsing result is the same as the return result from the graph database if the parsing result and the return result from the graph database meet the preset comparison manner; otherwise, the comparison result is that the parsing result is different from the return result from the graph database.

In some embodiments after constructing the improved BDD test framework, the method further includes:

acquiring a test case submitted by a submitter, acquiring development completion information obtained by a developer based on the test case, performing automated testing on the test case according to the development completion information to generate a test report, and sending the test report to the submitter.

According to a second aspect, the embodiments of the present disclosure provide a system for verifying a resulting behavior of a graph query language, including a test framework developing module and a test case developing module, wherein the test framework developing module includes a parsing module, an interaction module, and a result comparison module;

the test case developing module is configured to migrate a first Gherkin text in a graph query language standard to be a second Gherkin text in a graph query language according to syntax of the graph query language;

the parsing module is configured to add a lexical parser and a preset lexical rule to a BDD test framework, to construct an improved BDD test framework, and acquire a first parsing result of the second Gherkin text from the improved BDD test framework, wherein the first parsing result is an expected result of the second Gherkin text;

the interaction module is configured to check a background environment and condition preparation according to the second Gherkin text, and execute the graph query language to acquire a first return result from a graph database, wherein the second Gherkin text includes the background environment, the condition preparation, the graph query language, and the expected result; and the result comparison module is configured to acquire a comparison result between the first parsing result and the first return result from the graph database, wherein the graph query language meets the graph query language standard if the comparison result is that the first parsing result and the first return result are the same; otherwise, the graph query language does not meet the graph query language standard.

In some embodiments, before the parsing module adds the lexical parser and the preset lexical rule to the BDD test framework, the parsing module is further configured to define the preset lexical rule, and defining the preset lexical rule includes:

defining keywords in the graph database as a computer-recognizable text combination; and a process of parsing the second Gherkin text by the improved BDD test framework includes:

parsing the computer-recognizable text combination in the second Gherkin text according to the preset lexical rule to obtain the first parsing result.

In some embodiments, after the parsing module constructs the improved BDD test framework, the test case developing module is further configured to acquire a test case developed based on a Gherkin language as a third Gherkin text;

the parsing module is further configured to acquire a second parsing result of the third Gherkin text from the improved BDD test framework, wherein the second parsing result is an expected result of the third Gherkin text;

the interaction module is further configured to acquire a second return result from the graph database according to the third Gherkin text; and the result comparison module is further configured to acquire a comparison result between the second parsing result and the second return result from the graph database, wherein the graph database meets a test standard if the comparison result is that the second parsing result and the second return result are the same; otherwise, the graph database does not meet the test standard.

In some embodiments, the result comparison module acquires the comparison result between the parsing result and the return result from the graph database in the following manner:

acquiring a preset comparison manner;

determining whether the parsing result is the same as the return result from the graph database according to the preset comparison manner, wherein the comparison result is that the parsing result is the same as the return result from the graph database if the parsing result and the return result from the graph database meet the preset comparison manner; otherwise, the comparison result is that the parsing result is different from the return result from the graph database.

In some embodiments, after the parsing module constructs the improved BDD test framework, the system further includes an automated regression module, wherein the automated regression module is configured to acquire a test case submitted by a submitter, acquire development completion information obtained by a developer based on the test case, perform automated testing on the test case according to the development completion information to generate a test report, and send the test report to the submitter.

Compared with the related technology, in the method for verifying a resulting behavior of a graph query language provided by the present disclosure, a lexical parser and a preset lexical rule are added to a BDD test framework, to construct an improved BDD test framework; a first Gherkin text in a graph query language standard is migrated to be a second Gherkin text in a graph query language according to syntax of the graph query language; a first parsing result of the second Gherkin text is acquired from the improved BDD test framework, wherein the first parsing result is an expected result of the second Gherkin text; a background environment and condition preparation are checked according to the second Gherkin text, and the graph query language is executed to acquire a first return result from a graph database, wherein the second Gherkin text includes the background environment, the condition preparation, the graph query language, and the expected result; and a comparison result between the first parsing result and the first return result from the graph database is acquired, wherein the graph query language meets the graph query language standard if the comparison result is that the first parsing result and the first return result are the same; otherwise, the graph query language does not meet the graph query language standard. The present disclosure solves the problem that the BDD test framework cannot recognize complex Gherkin texts, has a single function, and cannot verify whether the graph query language is compatible with the graph query language standard, thereby facilitating the development of graph databases.

BRIEF DESCRIPTION OF DRAWINGS

The accompanying drawings described here are provided for further understanding of the present disclosure, and constitute a part of the present disclosure. The exemplary embodiments of the present disclosure and illustrations thereof are intended to explain the present disclosure, but do not constitute inappropriate limitations to the present disclosure. In the drawings.

DETAILED DESCRIPTION

Figure 1:
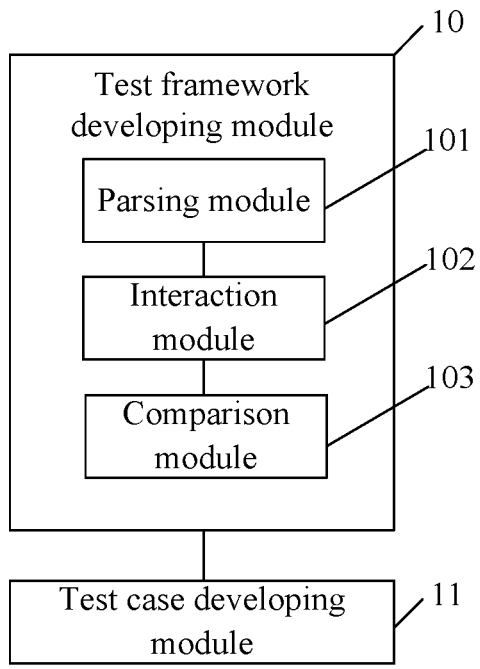
FIG. 1 is a structural block diagram of a system for verifying a resulting behavior of a graph query language according to an embodiment of the present disclosure.

To make the objectives, technical solutions, and advantages of the present disclosure clearer, the present disclosure is described below with reference to the accompanying drawings and embodiments. It should be understood that the embodiments described herein are merely used to explain the present disclosure, rather than to limit the present disclosure. All other embodiments obtained by those of ordinary skill in the art based on the embodiments of the present disclosure without creative efforts should fall within the protection scope of the present disclosure. In addition, it can also be appreciated that, although it may take enduring and complex efforts to achieve such a development process, for those of ordinary skill in the art related to the present disclosure, some changes such as design, manufacturing or production made based on the technical content in the present disclosure are merely regular technical means, and should not be construed as insufficiency of the present disclosure.

The "embodiment" mentioned in the present disclosure means that a specific feature, structure, or characteristic described in combination with the embodiment may be included in at least one embodiment of the present disclosure. The phrase appearing in different parts of the specification does not necessarily refer to the same embodiment or an independent or alternative embodiment exclusive of other embodiments. It may be explicitly or implicitly appreciated by those of ordinary skill in the art that the embodiment described herein may be combined with other embodiments as long as no conflict occurs.

Unless otherwise defined, the technical or scientific terms used in the present disclosure are as they are usually understood by those of ordinary skill in the art to which the present disclosure pertains. The terms "one", "a", "the" and similar words are not meant to be limiting, and may represent a singular form or a plural form. The terms "include", "contain", "have" and any other variants in the present disclosure mean to cover the non-exclusive inclusion, for example, a process, method, system, product, or device that includes a series of steps or modules (units) is not necessarily limited to those steps or units which are clearly listed, but may include other steps or units which are not expressly listed or inherent to such a process, method, system, product, or device. "Connected", "interconnected", "coupled" and similar words in the present disclosure are not restricted to physical or mechanical connections, but may include electrical connections, whether direct or indirect. The term "multiple" in the present disclosure means two or more. The term "and/or" describes associations between associated objects, and it indicates three types of relationships. For example, "A and/or B" may indicate that A exists alone, A and B coexist, or B exists alone. The terms "first", "second", "third" and so on in the present disclosure are intended to distinguish between similar objects but do not necessarily indicate a specific order of the objects.

This embodiment provides a system for verifying a resulting behavior of a graph query language, for implementing the embodiments and preferred implementation manners of the present disclosure, which have been illustrated and are not described again. As used below, the terms "module", "unit", and "subunit" and the like may implement the combination of software and/or hardware having predetermined functions. Although the apparatus described in the following embodiments is preferably implemented by software, implementation by hardware or the combination of the software and the hardware is also possible and may be conceived.

FIG. 1 is a structural block diagram of a system for verifying a resulting behavior of a graph query language according to an embodiment of the present disclosure. As shown in FIG. 1, the system includes: a test framework developing module 10 and a test case developing module 11. The test framework developing module 10 includes a parsing module 101, an interaction module 102, and a result comparison module 103.

The test case developing module 11 is configured to migrate a first Gherkin text in a graph query language standard to be a second Gherkin text in a graph query language according to syntax of the graph query language. For example, the graph query language standard is an openCypher standard, and the graph query language is nGQL, wherein nGQL is a graph query language developed by the graph database Nebula Graph. In order to determine whether nGQL is compatible with the openCypher standard, a first Gherkin text in the openCypher standard may be migrated to be a second Gherkin text in nGQL according to syntax of nGQL.

The parsing module 101 is configured to add a lexical parser and a preset lexical rule to a BDD test framework, to construct an improved BDD test framework, and acquire a first parsing result of the second Gherkin text from the improved BDD test framework, wherein the first parsing result is an expected result of the second Gherkin text. The BDD test framework can only recognize simple Gherkin texts. For example, the BDD test framework can only recognize keywords such as feature, background, scenario, given, when, and then. The parsing module 101 uses lex&yacc as a basic lexical parser, and after the lexical parser and the preset lexical rule are added to the BDD test framework to construct the improved BDD test framework, complex Gherkin texts can be recognized. The "then" keyword part in the Gherkin text is an expected result in the Gherkin text. The BDD test framework can only recognize the keyword part, but cannot recognize the meaning of the "then" keyword part, while the improved BDD test framework can recognize the meaning of the "then" keyword part. The improved BDD test framework parses the second Gherkin text to obtain a first parsing result of the "then" keyword part.

The interaction module 102 is configured to check a background environment and condition preparation by operating the graph database according to the second Gherkin text, and execute the graph query language to acquire a first return result from a graph database, wherein the second Gherkin text includes the background environment, the condition preparation, the graph query language, and the expected result. In this embodiment, the interaction module 102 is responsible for interacting with the graph database Nebula Graph, and the interaction module 102 operates the graph database Nebula Graph to perform the following steps:

S1: Obtain and check the background environment and condition preparation. The background environment and condition preparation may be obtained from items of "Background" and "Given" in the Gherkin text, for example, a specified dataset is loaded and initialization is performed.

S2: Execute one or more graph query languages nGQL. The graph query language nGQL may be obtained from the item "When executing query" in the Gherkin text.

S3: The interaction module 102 obtains a return result from the graph database Nebula Graph, and re-organizes the return result into a certain data structure. The return result from the graph database Nebula Graph is in the form of a table, and the table may include a character string or a regular expression.

When the table is in the form of a character string, it is expressed as follows:

| VertexID | player.name | player.age |
|----------|-------------|------------|
| 'Tom'    | 'Tom'       | 10         |

When the table is in the form of a regular expression, it is expressed as follows:

| Name          | Status          | Hosts         |
|---------------|-----------------|---------------|
| r'SNAPSHOT_.*'| r'INVALID/VALID'| r'127.0.0.1:.*' |

The interaction module 102 parses each cell in the table into data structures such as NULL, EMPTY, BOOL, INT, DOUBLE, STRING, DATE, TIME, DATETIME, LIST, SET, MAP, VERTEX, EDGE, and PATH.

The interaction module 102 is further configured to manage concurrency, and control test cases to be executed concurrently or out of order, and is further configured to manage rights and record accounts accessing the graph database Nebula Graph.

The result comparison module 103 is configured to acquire a comparison result between the first parsing result and the first return result from the graph database, wherein the graph query language meets the graph query language standard if the comparison result is that the first parsing result and the first return result are the same; otherwise, the graph query language does not meet the graph query language standard. The first parsing result is an expected result of the first Gherkin text in the openCypher standard. The first return result from the graph database is a return result from the graph database Nebula Graph obtained based on the second Gherkin text, wherein the second Gherkin text is obtained by migrating the first Gherkin text in the openCypher standard to nGQL. If the first parsing result is the same as the first return result from the graph database Nebula Graph, it indicates that nGQL meets the openCypher standard.

On the one hand, through the parsing module 101, the result comparison module 103 describes the background environment, condition preparation, graph query language nGQL, and expected result of the test case in the Gherkin text in a way that is close to natural language; on the other hand, through the interaction module 102, the result comparison module 103 acquires a result set returned from the graph database Nebula Graph, and compares the results from the two aspects. The implementation principle of the result comparison module 103 includes the following steps:

S1: For each type specified by the parsing module 101, such as NULL or vertex, construct a corresponding memory object in python, wherein at least the following memory objects are constructed: NULL, EMPTY, BOOL, INT, DOUBLE, STRING, DATE, TIME, DATETIME, LIST, SET, MAP, VERTEX, EDGE, and PATH.

S2: For each type returned by the interaction module 102, also construct a corresponding memory object in python, including at least the following memory objects: NULL, EMPTY, BOOL, INT, DOUBLE, STRING, DATE, TIME, DATETIME, LIST, SET, MAP, VERTEX, EDGE, and PATH.

S3: Acquire a preset comparison manner, and determine whether the parsing result is the same as the return result from the graph database according to the preset comparison manner.

By adding the lexical parser and the preset lexical rule to the BDD test framework, the present disclosure solves the problem that the BDD test framework cannot recognize complex Gherkin texts and has a single function. The first Gherkin text in the openCypher standard is migrated to be the second Gherkin text in the graph query language nGQL according to the syntax of the graph query language nGQL, and the parsing result obtained based on the second Gherkin text is compared with the return result. If the comparison result is that the second Gherkin text is the same as the return result, it indicates that the graph query language nGQL is compatible with the openCypher standard, thus solving the problem that the BDD test framework cannot verify whether the graph query language is compatible with the graph query language standard, and facilitating the development of graph databases.

In some embodiments, if the comparison result is that the first parsing result and the first return result are different, the graph query language does not meet the graph query language standard. By modifying implementation code of the graph database, the graph query language corresponding to the graph database can meet the graph query language standard.

In some embodiments, before the parsing module 101 adds the lexical parser and the preset lexical rule to the BDD test framework, the parsing module 101 further defines a preset lexical rule. Defining the preset lexical rule includes:

defining keywords in the graph database as a computer-recognizable text combination, which is partially illustrated as follows:

map_items is defined as LABEL: expr;
map is defined as {map_items};
vertex is defined as (tag_list) or (STRING tag_list);
edge_props is defined as map;
edge is defined as [STRING→STRING edge_props];
tag is defined as LABEL map;
tag_list is defined as tag_list tag;

wherein map_items represents a key-value correspondence; map represents a mapping, i.e., a set of map_items; vertex represents a point, edge represents an edge; tag represents a point type; tag_list represents a list of tag combinations; edge_props represents a new alias definition for map. The above is only a simplified example. More comprehensive conditions may be taken into consideration during specific implementation. For example, edges can be designed as "directed edges" or "undirected edges", and paths or subgraphs in a graph can be designed as a combination of a series of points and edges. The above definitions are not unique, for example, map can be added with a definition { }, and map_items can be added with a definition STRING:expr, which can be defined in various ways to support more cases and to make the graph query language more capable of querying graph databases.

A process of parsing the second Gherkin text by the improved BDD test framework includes: parsing the computer-recognizable text combination in the second Gherkin text according to the preset lexical rule to obtain the first parsing result. For example, when text ("Tiago Splitter") appears in the Gherkin text, it is recognized as a vertex, i.e. a vertex in the graph; when the text ["Tim Duncan"→"Manu Ginobili"] appears in the Gherkin text, it is recognized as an edge, with the vertex "Tim Duncan" pointing to the vertex "Manu Ginobili".

In some embodiments, after the parsing module 101 constructs the improved BDD test framework, the test case developing module 11 is further configured to acquire a test case developed based on the Gherkin language as a third Gherkin text; the parsing module 101 is further configured to acquire a second parsing result of the third Gherkin text from the improved BDD test framework, wherein the second parsing result is an expected result of the third Gherkin text; the interaction module 102 is further configured to acquire a second return result from the graph database based on the third Gherkin text; the result comparison module 103 is further configured to acquire a comparison result between the second parsing result and the second return result from the graph database, wherein if the comparison result is that the second parsing result and the second return result are the same, the graph database meets a test standard; otherwise, the graph database does not meet the test standard. A test case is a set of test inputs, execution conditions, and expected results prepared for a particular purpose to verify whether a particular software requirement is met. When the second parsing result obtained based on the third Gherkin text is the same as the second return result from the graph database, the graph database meets the test standard, i.e., the graph database meets the functional requirements proposed by the demand side; otherwise, the developer can modify the code of the graph database to make the graph database meet the test standard.

the result should be: the content of rows, columns and cells should be exactly the same;

the result should include: as long as the following content is included;

the result should be, in any order: independent of the row order;

no side effects: no other side effects are allowed; for example, the purpose is to determine whether a graph element exists, and automatically adding the element when the element does not exist is a side effect;

the result should be, in any order, with relax comparison: the result set needs to be in the following form and independent of the row order, and includes at least the following content;

It is determined whether the parsing result is the same as the return result from the graph database according to the preset comparison manner; for example, the preset comparison manner is "the result should be, in any order", and in this case, the comparison result between the parsing result and the return result is that they are the same if the row order of the parsing result is different from that of the return result while the rest of the content is the same.

The comparison result is that the parsing result is the same as the return result from the graph database if the parsing result and the return result from the graph database meet the preset comparison manner; otherwise, the comparison result is that the parsing result is different from the return result from the graph database.

Preferably, the following is an example of a test case developed based on the Gherkin language, wherein the content following the sign // is the annotation:

```
Background:
    Given a graph with space named "nba" // Give a graph space "nba"
    Scenario: single both direction edge with properties // Name of the test case
        When executing query:// Execute the first nGQL query
        """
        MATCH(:player{name:"TimDuncan"})-[e:serve*2..3{start_year:2000}]-(v)
            RETURN e, v
        """
        // Starting from the node named "TimDuncan", walk 2 or 3 steps along an edge
of the type serve, wherein the attributes on the edge satisfy start_year:2000
            // Return the nodes and edges that are walked to in such a manner
            Then the result should be, in any order:// The result set needs to be in the
following form and independent of the row order
            | e | v |
    When executing query:// Execute the second nGQL query
        """
        MATCH (:player{name:"Tim Duncan"})-[e:like*2..3{likeness:90}]-(v)
            RETURN e, v
        """
    Then the result should be, in any order, with relax comparison:
    // The result set needs to be in the following form and independent of the row order, and
includes at least the following content
    | e  | v  |
    |[[:like "Tim Duncan"<-"Manu Ginobili"],[:like "Manu Ginobili"<-"Tiago Splitter"]] |
("Tiago Splitter") |
```

In some embodiments, in the case that the parsing result is the first parsing result and the return result from the graph database is the first return result, or the parsing result is the second parsing result and the return result from the graph database is the second return result, the result comparison module 103 acquires the comparison result between the parsing result and the return result from the graph database in the following manner:

A preset comparison manner is acquired, wherein the preset comparison manner is illustrated as follows:

The test case above is explained in detail as follows.

Background is generally a preparatory action, for example, selecting the graph space (data collection) "nba", or loading one or more csv files in a specified format into the graph space. One Gherkin text file shares the same background, and the background indicates that all subsequent operations of Nebula Graph are within this graph space.

Scenario is a combination of a set of test query statements. One Gherkin text file can have multiple scenarios, and for each scenario, a preparation condition for the scenario can be specified individually based on the Given syntax, wherein a control character @skip can be used to skip a particular scenario.

"When" syntax sends the text between the triple quotes ("""" . . . """") to the graph database Nebula Graph via the interaction module 102 and acquires the return result from the graph database Nebula Graph.

"Then" syntax specifies how the return result from the graph database Nebula Graph and the expected result are compared through the result comparison module 103. The result comparison module 103 also controls a control flow to continue with the next comparison or exit when the comparison result does not meet the expected result. For example, if the return result from the graph database does not meet the expected result for the first "Then" keyword part, it is determined whether to continue with the next "When" keyword part. The entire test flow may be stopped for retaining the site and troubleshooting, or a failure of a "Then" keyword part is recorded and other tests are continued. Test cases can be derived from the syntax of nGQL or new syntax requirements, or migrated from a Gherkin text file of the openCypher standard.

In the related technology, general test cases are implemented by adding python, C++ or java code, which has relatively high technical requirements for test case developers. The test case developers need to master programming skills. Those who are most familiar with nGQL (usually algorithm engineers and product personnel) will find it difficult to add test cases on their own, and need to rely on coders to add cases, resulting in an excessively long process and high staff costs. The test case developing module 11 for developing and migrating test cases based on Gherkin lowers the threshold for test case development and facilitates migration. To write test cases, writers only need to master a few basic Gherkin syntaxes, and are not required to have basic programming skills. This allows students, programmers, documentation engineers, and algorithm developers to add test cases according to their own use cases, and the Gherkin text of the openCypher standard can be migrated with only a few adaptations.

Figure 2:
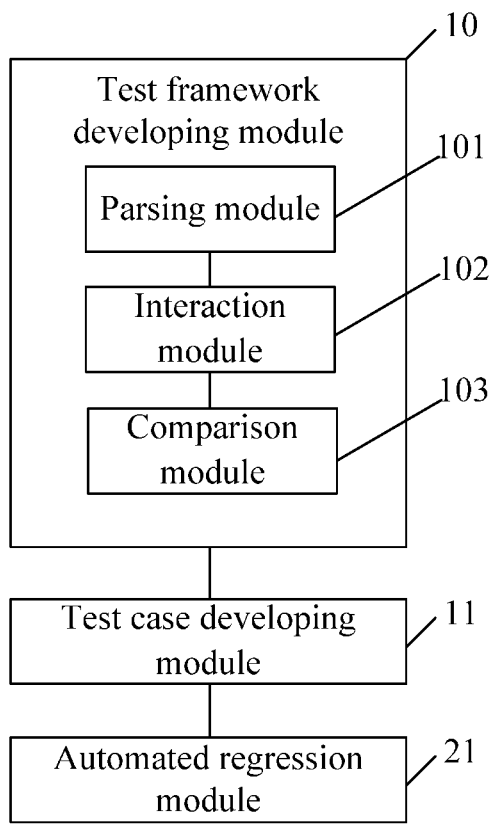
FIG. 2 is a structural block diagram of another system for verifying a resulting behavior of a graph query language according to an embodiment of the present disclosure.

In some embodiments, FIG. 2 is a structural block diagram of another system for verifying a resulting behavior of a graph query language according to an embodiment of the present disclosure. As shown in FIG. 2, after the parsing module 101 constructs the improved BDD test framework, the system further includes an automated regression module 21.

The automated regression module 21 is configured to acquire a test case submitted by a submitter, acquire development completion information obtained by a developer based on the test case, perform automated testing on the test case according to the development completion information to generate a test report, and send the test report to the submitter.

In this embodiment, github-action is chosen to implement automated regression of daily test cases. However, any other automated regression method for test cases can be used. The automated regression module 21 submits a Gherkin text in which a test case is stored to github.com in the form of a github pull request, automatically triggers github-action to verify the Gherkin text, generates a test report based on the verification result, and sends the test report to the submitter.

To add new nGQL syntax, a user, product manager or developer needs to write a Gherkin text, which describes a return behavior (Then) expected from the graph database Nebula Graph in response to some situations (When) in each background (Background) and scenario (Scenario) of a demand side. Accordingly, the demand side needs to give as many Background, Scenario, When and Then as possible to cover more boundary cases. The demand side also submits the Gherkin text to github in the form of a pull request and goes through several rounds of updates. Once finishing coding, the developer runs the Gherkin text to prove that the developed function has met the requirements of the demand side.

When new syntax of the graph query language nGQL needs to be added to the graph database Nebula Graph, there is no mechanism to formally describe the requirements, and the requirements described in natural language during the syntax design phase are prone to boundaries and omissions, leading to an uncritical analysis of the requirements. The automated regression module 21 makes it easier to expand the syntax of the graph query language nGQL. Any demand side can build a standard proposal and a series of corresponding test cases automatically by writing a Gherkin text according to the Gherkin syntax first; product and R&D personnel can discuss, modify and expand each boundary scenario based on the Gherkin text accordingly; after the R&D function is completed, the test cases can be run automatically to verify whether the proposal requirements have been met. This is more formal and verifiable than the uncritical requirement descriptions in natural language.

When any code development activity breaks the previous nGQL syntax or semantics or causes incompatibility with openCypher, the error can be found during the development process through automated daily regression testing, which avoids delaying the error to the integration testing process or even after the release. Any user can start the automated test case regression by submitting the Gherkin text to a test repository.

It should be noted that each of the above modules may be a functional module or a program module, and may be implemented by software or hardware. For modules implemented by hardware, the modules can be located in the same processor; or the modules, in any combination, can be located in different processors.

Figure 3:
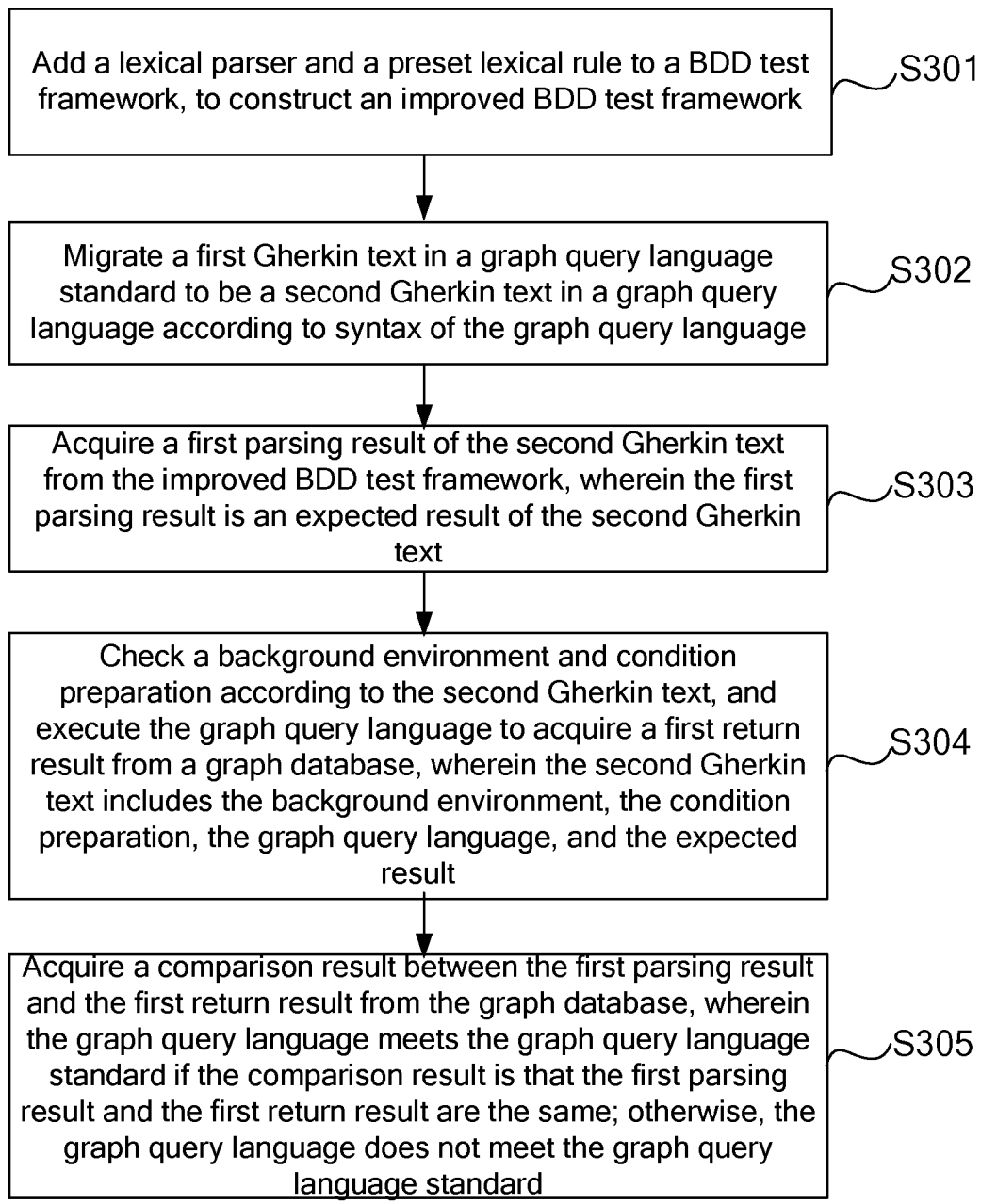
FIG. 3 is a flowchart of a method for verifying a resulting behavior of a graph query language according to an embodiment of the present disclosure.

This embodiment provides a method for verifying a resulting behavior of a graph query language. FIG. 3 is a flowchart of a method for verifying a resulting behavior of a graph query language according to an embodiment of the present disclosure. As shown in FIG. 3, the method includes the following steps:

Step S301: Add a lexical parser and a preset lexical rule to a BDD test framework, to construct an improved BDD test framework.

Step S302: Migrate a first Gherkin text in a graph query language standard to be a second Gherkin text in a graph query language according to syntax of the graph query language.

Step S303: Acquire a first parsing result of the second Gherkin text from the improved BDD test framework, wherein the first parsing result is an expected result of the second Gherkin text.

Step S304: Check a background environment and condition preparation according to the second Gherkin text, and execute the graph query language to acquire a first return result from a graph database, wherein the second Gherkin text includes the background environment, the condition preparation, the graph query language, and the expected result.

Step S305: Acquire a comparison result between the first parsing result and the first return result from the graph database, wherein the graph query language meets the graph query language standard if the comparison result is that the first parsing result and the first return result are the same; otherwise, the graph query language does not meet the graph query language standard.

It should be noted that, steps shown in the foregoing process or the flowchart in the accompanying drawings may be executed in a computer system such as a set of computer executable instructions. Moreover, although a logic sequence is shown in the flowchart, the shown or described steps may be executed in a sequence different from that described here.

This embodiment further provides an electronic device, including a memory and a processor. The memory stores a computer program, and the processor is configured to perform the steps in any of the method embodiments above by running the computer program.

In an embodiment, a computer device is provided. The computer device may be a terminal. The computer device includes a processor, a memory, a network interface, a display, and an input apparatus which are connected through a system bus. The processor of the computer device is configured to provide computing and control capabilities. The memory of the computer device includes a nonvolatile storage medium and an internal memory. The nonvolatile storage medium stores an operating system and a computer program. The internal memory provides an environment for operations of the operating system and the computer program in the nonvolatile storage medium. The network interface of the computer device is configured to communicate with an external terminal through a network. When the computer program is executed by the processor, a method for verifying a resulting behavior of a graph query language is implemented. The display of the computer device may be an LCD or an e-ink display; the input apparatus of the computer device may be a touch layer covering the display, or a key, a trackball or a touchpad set on the housing of the computer device, or an external keyboard, a touchpad or a mouse, etc.

Those of ordinary skill in the art may understand that all or some of the procedures in the methods of the foregoing embodiments may be implemented by a computer program instructing related hardware. The computer program may be stored in a nonvolatile computer readable storage medium. When the computer program is executed, the procedures in the embodiments of the foregoing methods may be performed. Any reference used for a memory, a storage, a database, or other mediums used in various embodiments provided in the present application may include a nonvolatile memory and/or a volatile memory. The nonvolatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. As description rather than limitation, the RAM can be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a Rambus direct RAM (RDRAM), a direct Rambus dynamic RAM (DRDRAM), and a Rambus dynamic RAM (RDRAM).

A person skilled in the art should understand that, the technical features of the above embodiments can be arbitrarily combined. In an effort to provide a concise description, not all possible combinations of all the technical features of the embodiments are described. However, these combinations of technical features should be construed as disclosed in the description as long as no contradiction occurs.

The above embodiments are merely illustrative of several implementation manners of the present disclosure, and the description thereof is more specific and detailed, but is not to be construed as a limitation to the patentable scope of the present disclosure. It should be pointed out that several variations and improvements can be made by those of ordinary skill in the art without departing from the conception of the present disclosure, but such variations and improvements should fall within the protection scope of the present disclosure. Therefore, the protection scope of the patent of the present disclosure should be subject to the appended claims.

What is claimed is:

1. A method for verifying a resulting behavior of a graph query language, comprising:

defining a preset lexical rule, which comprises defining keywords in a graph database as a computer-recognizable text combination;

adding a lexical parser and a preset lexical rule to a Behavior Driven Development (BDD) test framework, to construct an improved BDD test framework;

migrating a first Gherkin text in a graph query language standard to be a second Gherkin text in a graph query language according to syntax of the graph query language;

acquiring a first parsing result of the second Gherkin text from the improved BDD test framework, wherein the first parsing result is an expected result of the second Gherkin text, and a process of parsing the second Gherkin text by the improved BDD test framework comprises parsing the computer-recognizable text combination in the second Gherkin text according to the present lexical rule to obtain the first parsing result;

checking a background environment and condition preparation according to the second Gherkin text, and executing the graph query language to acquire a first return result from a graph database, wherein the second Gherkin text comprises the background environment, the condition preparation, the graph query language, and the expected result, and the first return result is a form of a table that comprises a character string or a regular expression; and acquiring a comparison result between the first parsing result and the first return result from the graph database, wherein the graph query language meets the graph query language standard if the comparison result is that the first parsing result and the first return result are the same;

otherwise, the graph query language does not meet the graph query language standard;

wherein acquiring the comparison result between the first parsing result and the first return result from the graph database comprises:

constructing a corresponding memory object in python for each type specified by the step of acquiring a first parsing result of the second Gherkin text from the improved BDD test framework, wherein the memory object comprises NULL, EMPTY, BOOL, INT, DOUBLE, STRING, DATE, TIME, DATETIME, LIST, SET, MAP, VERTEX, EDGE, and PATH;

constructing a corresponding memory object in python for each type returned by the step of executing the graph query language to acquire a first return result from a graph database, wherein the memory object comprises NULL, EMPTY, BOOL, INT, DOUBLE, STRING, DATE, TIME, DATETIME, LIST, SET, MAP, VERTEX, EDGE, and PATH; acquiring a present comparison manner, and determining whether the parsing result is the same as the return result from the graph database according to the present comparison manner;

wherein after constructing the improved BDD test framework, the method further comprises:

acquiring a test case developed based on a Gherkin language as a third Gherkin text;

acquiring a second parsing result of the third Gherkin text from the improved BDD test framework, wherein the second parsing result is an expected result of the third Gherkin text;

acquiring a second return result from the graph database according to the third Gherkin text; and acquiring a comparison result between the second parsing result and the second return result from the graph database, wherein the graph database meets a test standard if the comparison result is that the second parsing result and the second return result are the same; otherwise, the graph database does not meet the test standard.

2. The method according to claim 1, wherein acquiring the comparison result between the parsing result and the return result from the graph database comprises:

acquiring a preset comparison manner;

determining whether the parsing result is the same as the return result from the graph database according to the preset comparison manner, wherein the comparison result is that the parsing result is the same as the return result from the graph database if the parsing result and the return result from the graph database meet the preset comparison manner; otherwise, the comparison result is that the parsing result is different from the return result from the graph database.

3. The method according to claim 1, wherein after constructing the improved BDD test framework, the method further comprises:

acquiring a test case submitted by a submitter, acquiring development completion information obtained by a developer based on the test case, performing automated testing on the test case according to the development completion information to generate a test report, and sending the test report to the submitter.

* * * * *